United States Patent
Reigle et al.

(10) Patent No.: US 11,220,078 B2
(45) Date of Patent: Jan. 11, 2022

(54) BALL HITCH TIP OUT PLUG, TRIANGLE LEG TIP OUT PLUG, COMBINATION, AND TIP OUT PLUG TOOL

(71) Applicant: COOPER TIRE & RUBBER COMPANY, Findlay, OH (US)

(72) Inventors: Steve Reigle, Pandora, OH (US); Chris Ackerman, Bluffton, OH (US); Brett Badertscher, Ada, OH (US); Curtis Barron, Columbus, OH (US); Kurt Utrup, Ottawa, OH (US)

(73) Assignee: COOPER TIRE & RUBBER COMPANY, Finday, OH (US)

( * ) Notice: Subject to any disclaimer, the term of this patent is extended or adjusted under 35 U.S.C. 154(b) by 0 days.

(21) Appl. No.: 16/608,659

(22) PCT Filed: Apr. 26, 2018

(86) PCT No.: PCT/US2018/029592
§ 371 (c)(1),
(2) Date: Oct. 25, 2019

(87) PCT Pub. No.: WO2018/200828
PCT Pub. Date: Nov. 1, 2018

(65) Prior Publication Data
US 2020/0180250 A1    Jun. 11, 2020

Related U.S. Application Data

(60) Provisional application No. 62/490,311, filed on Apr. 26, 2017.

(51) Int. Cl.
*B29D 30/06* (2006.01)
*B29D 30/72* (2006.01)
*B29C 33/30* (2006.01)

(52) U.S. Cl.
CPC ............ *B29D 30/72* (2013.01); *B29C 33/306* (2013.01); *B29D 30/0662* (2013.01); *B29D 2030/726* (2013.01)

(58) Field of Classification Search
CPC ............ B29D 30/0606; B29D 30/0662; B29D 2030/726; B29C 33/306; B29C 33/424; B29C 2037/80
See application file for complete search history.

(56) References Cited

U.S. PATENT DOCUMENTS 1,567,402 A * 12/1925 Venn ..................... B29C 33/424
425/35
2,296,016 A * 9/1942 Bostwick ........... B29D 30/0606
425/28.1
(Continued)

FOREIGN PATENT DOCUMENTS

CN          101314249      12/2008
DE      10 2010 017 251    * 12/2011
(Continued)

OTHER PUBLICATIONS

PCT/US2018/029592 International Search Report, Written Opinion, dated Aug. 27, 2018.
(Continued)

*Primary Examiner* — James P Mackey
(74) *Attorney, Agent, or Firm* — Fay Sharpe LLP

(57) ABSTRACT

A combination of first and second plugs for a tire mold includes associated first and second receivers/jackets. Fasteners secure the receiver to an associated tire mold. A securing member extends from the receiver into the cavity of the first receiver to retain the first plug therein. The first plug is contoured and dimensioned for mating receipt in the first receiver cavity. The second plug is likewise contoured and dimensioned for mating receipt in the associated second receiver cavity, but will not be accepted in the first receiver.
(Continued)

A tool is provided to facilitate insertion and removal of the first and second plugs, and limit the potential for damage to the associated tire mold.

22 Claims, 15 Drawing Sheets

(56) References Cited

U.S. PATENT DOCUMENTS

| | | | | |
|---|---|---|---|---|
| 2,679,663 | A * | 6/1954 | Schwemler | B29D 30/0633 |
| | | | | 425/28.1 |
| 3,100,318 | A * | 8/1963 | Knox | B29D 30/0606 |
| | | | | 249/61 |
| 3,407,499 | A | 10/1968 | Rapaport | |
| 3,734,448 | A * | 5/1973 | Rusk | B41B 11/00 |
| | | | | 249/103 |
| 4,547,139 | A | 10/1985 | Hershberger | |
| 5,939,002 | A | 8/1999 | Heindel | |
| 6,308,929 | B1 * | 10/2001 | Wieder | B29C 45/2703 |
| | | | | 249/103 |
| 6,315,539 | B1 * | 11/2001 | Yutronkie | B29D 30/0606 |
| | | | | 249/103 |
| 6,942,476 | B2 | 9/2005 | Parmelee et al. | |
| 7,670,124 | B2 | 3/2010 | Hyodo | |
| 7,883,326 | B1 | 2/2011 | Parmelee | |
| 9,597,849 | B2 | 3/2017 | Villeneuve | |
| 2011/0180200 | A1 | 7/2011 | Parmelee | |
| 2017/0014883 | A1 | 1/2017 | Streen et al. | |

FOREIGN PATENT DOCUMENTS

| | | |
|---|---|---|
| EP | 1 136 217 A2 | 9/2001 |
| JP | 2006 001224 A | 1/2006 |
| JP | 50-41615 | * 10/2012 |

OTHER PUBLICATIONS

First Notification of Office Action dated May 19, 2021 issued by China National Intellectual Property Administration for Application No. 201880042498.4 (with English explanation).

* cited by examiner

BALL HITCH TIP OUT PLUG, TRIANGLE LEG TIP OUT PLUG, COMBINATION, AND TIP OUT PLUG TOOL

This application claims the priority benefit of U.S. provisional application Ser. No. 62/490,311, filed Apr. 26, 2017, the entire disclosure of which is expressly incorporated herein by reference.

BACKGROUND

This invention relates to mold assemblies, and more particularly to mold inserts designed for installation and removal from a mold, such as a tire mold.

A cured tire requires certain manufacturing information to be molded into a sidewall of the tire. In fact, federal regulations specify the information that is required to be included on the tire. For example, one part of that required information relates to the curing press in which the tire was vulcanized, and a second part of the required information relates to the week and year that the tire was vulcanized (referred to as the Department of Transportation date code). If the information is provided in incorrect locations on the tire, the sidewall will not conform with the specified format.

Heretofore, potential problems could be associated with installation and removal of a date code plug or other cavity insert designed to be inserted into a tire mold. It would be desirable to provide an arrangement that limits the potential for improper installation of cavity inserts, and likewise prevents an insert from being inserted into the incorrect location in the mold.

Current style plugs are typically removed with a hammer and punch which can lead to potentially damaging the sidewall of the tire mold. Consequently, it would be desirable to provide an arrangement that likewise limits the potential for potential damage to the tire mold sidewall associated with removal of an insertion of plugs/inserts.

A need exists for an improved arrangement that provides at least one or more of the above-described features, as well as still other features and benefits.

SUMMARY

An improved plug arrangement is provided.

In one embodiment, the plug arrangement or plug assembly for a tire mold includes a receiver or jacket having a first face with an irregular shaped cavity extending inwardly therefrom to a first surface. A fastener secures the receiver to an associated tire mold. A securing member extends from the receiver into the cavity. A plug is contoured and dimensioned for mating receipt in the receiver cavity and retained therein by engagement with the securing member.

The first surface of the receiver includes a first opening extending therethrough dimensioned to receive the fastener.

The plug includes a recess extending inwardly from a perimeter edge of the plug and the recess is dimensioned to receive the securing member therein.

The securing member is secured to and extends perpendicularly outward from the first surface of the receiver, and the recess extends in a direction substantially perpendicular to the securing member.

Another embodiment of the plug has an angled surface provided on a rear face of the plug that faces the first surface of the jacket.

The angled surface extends inwardly from a first end of the plug, and the plug includes another angled surface extending inwardly from a second end of the plug.

The securing member preferably includes a spherical portion at a distal end of a stem that is connected to the receiver first surface.

The spherical portion has a greater cross-sectional dimension than a cross-sectional dimension of the stem.

The plug includes a recess extending inwardly from a perimeter edge of the plug and dimensioned to receive the stem therein, and the spherical portion of the securing member has a greater cross-sectional dimension than undercut shoulders that define the recess and prevent inadvertent removal of the plug from the jacket/receiver.

The plug includes first and second angled surfaces that extend inwardly from opposite, first and second ends, respectively, of the plug toward a central planar portion.

The cavity has a D-shaped perimeter, and the plug has a similarly contoured, D-shaped perimeter.

Another embodiment of a plug assembly for a tire mold includes a jacket/receiver having a first surface with an irregular shaped cavity extending inwardly therefrom, the first surface including a slot. A fastener secures the receiver to an associated tire mold. A plug is contoured and dimensioned for mating receipt in the receiver cavity, the plug including a protrusion extending from a first surface thereof and dimensioned for receipt in the receiver slot.

A wall extends above the first surface of the receiver adjacent the slot serving as a fulcrum point for tipping the plug relative to the receiver when received therein.

The wall preferably extends perpendicular to the slot.

The protrusion preferably has a triangular shape.

An outer perimeter of the plug and an inner perimeter of the cavity are dimensioned for a friction fit that retains the plug in the receiver.

The slot is formed along an edge of the receiver, and the protrusion is formed along an edge of the plug whereby the plug is capable of receipt in the receiver in only a single orientation when the protrusion faces the receiver first surface.

A combination of plug assemblies for a tire mold includes a first receiver having a first face with an irregular shaped cavity extending inwardly therefrom to a cavity first surface. A first fastener secures the first receiver to an associated tire mold. A first securing member extends from the receiver into the cavity. A first plug is contoured and dimensioned for mating receipt in the first receiver cavity and retained therein by engagement with the first securing member. A second receiver has a first surface with an irregular shaped cavity, and the first surface including a slot. A second fastener secures the second receiver to the associated tire mold. A second plug is contoured and dimensioned for mating receipt in the second receiver cavity, the second plug including a protrusion extending from a first surface thereof and dimensioned for receipt in the second receiver slot.

At least one of the first plug and the first receiver has a conformation that precludes mating engagement with the second receiver and the second plug, respectively.

A plug removal tool has an enlarged, first end to facilitate gripping by an associated user, and a second end that includes a pointed tip for engaging the plug mounted to the associated tire mold.

The pointed tip is preferably urged outwardly from the tool by a biasing member.

A polymer material surrounds the pointed tip that minimizes potential damage to the associated tire mold when using the plug removal tool.

One benefit of the present disclosure is the provision of jackets/receivers for tire mold inserts to be designed to prevent the plug from being installed improperly in the tire mold, or to prevent a plug being incorrectly mounted in its associated receiver.

Another advantage relates to the ease of installing and removing the plugs.

Yet another benefit is associated with eliminating the potential for damaging the sidewall of the tire mold.

A still further advantage is the design of plugs that can be installed/removed without the use of a hammer.

Benefits and advantages of the present disclosure will become more apparent from reading and understanding the following detailed description.

DETAILED DESCRIPTION

Figure 1:
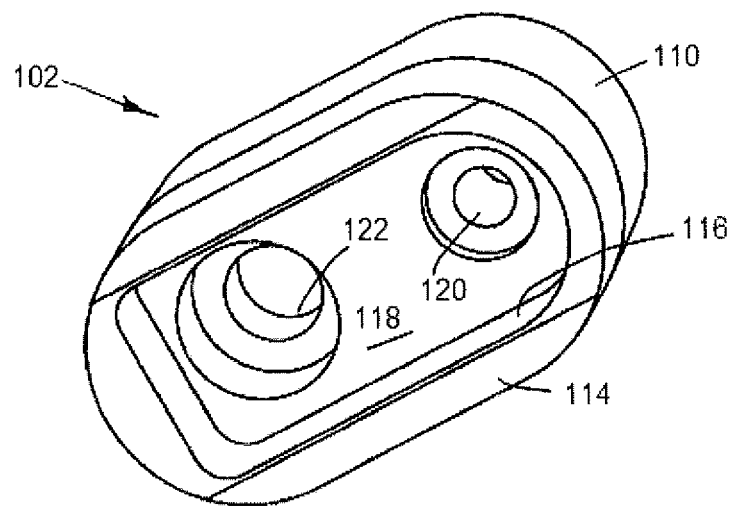
FIG. 1 is a perspective view of a first receiver/jacket of a plug arrangement/plug assembly.
Figure 2:
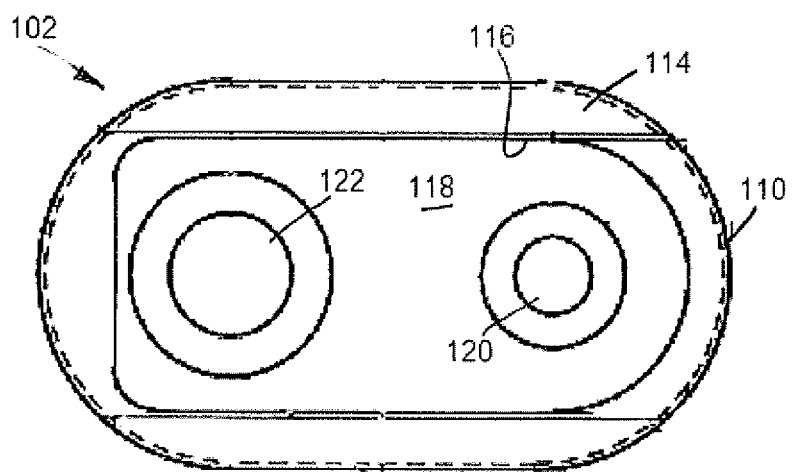
FIG. 2 is a top plan view of the receiver/jacket of FIG. 1.
Figure 3:
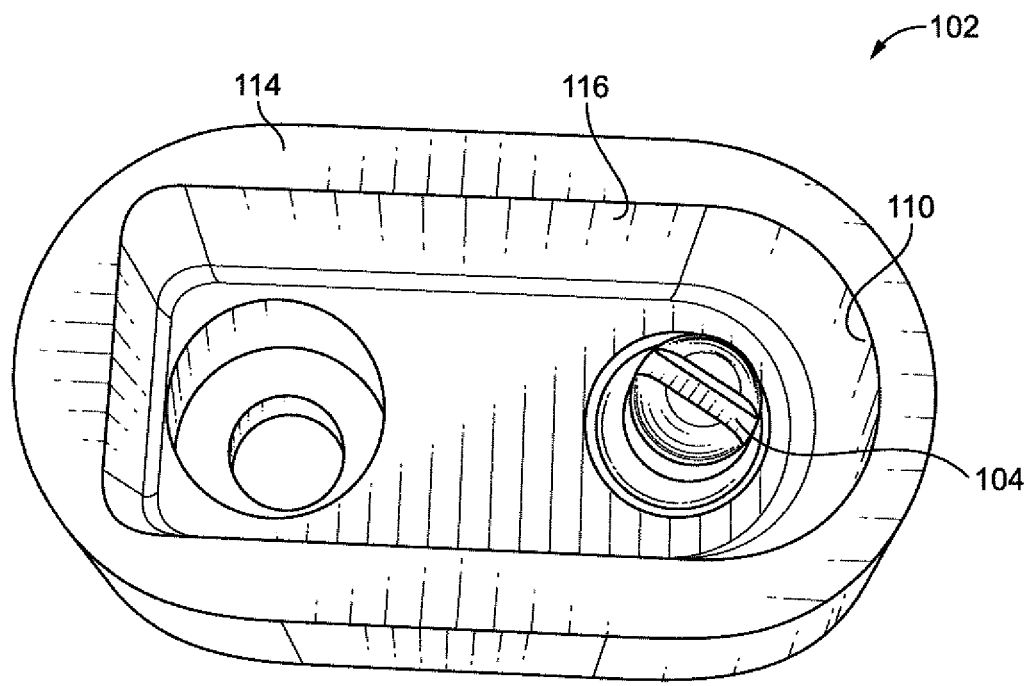
FIG. 3 is another top plan view showing a retainer received in one of the openings for securing a plug in the receiver.
Figure 4:
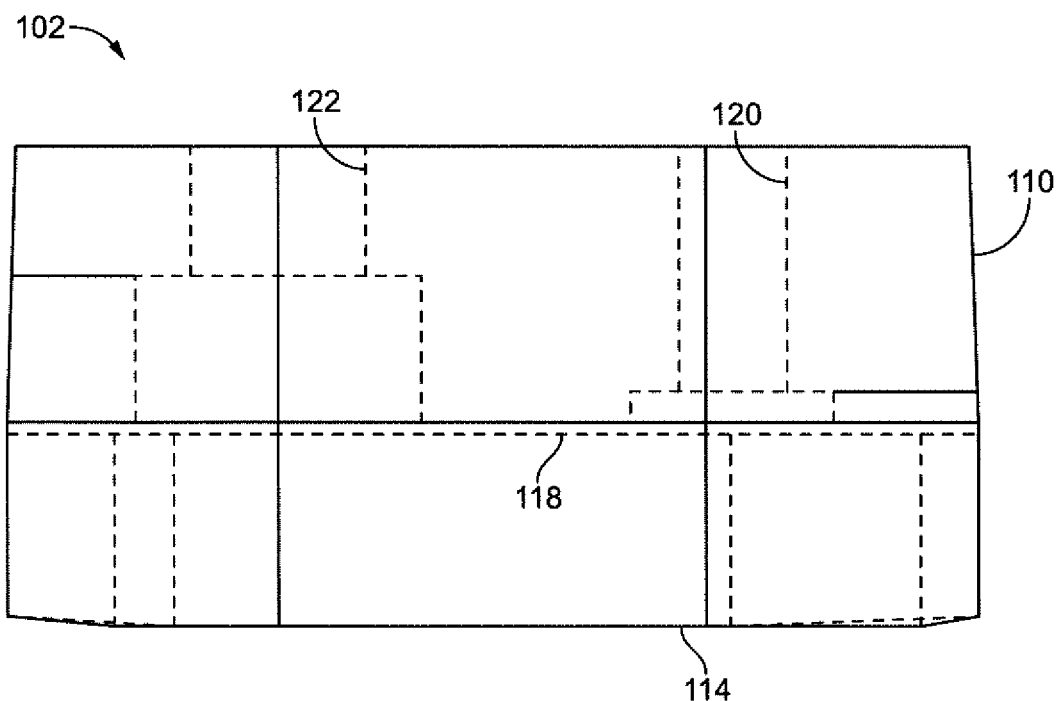
FIG. 4 is a front elevational view of the receiver/jacket of FIG. 1.
Figure 5:
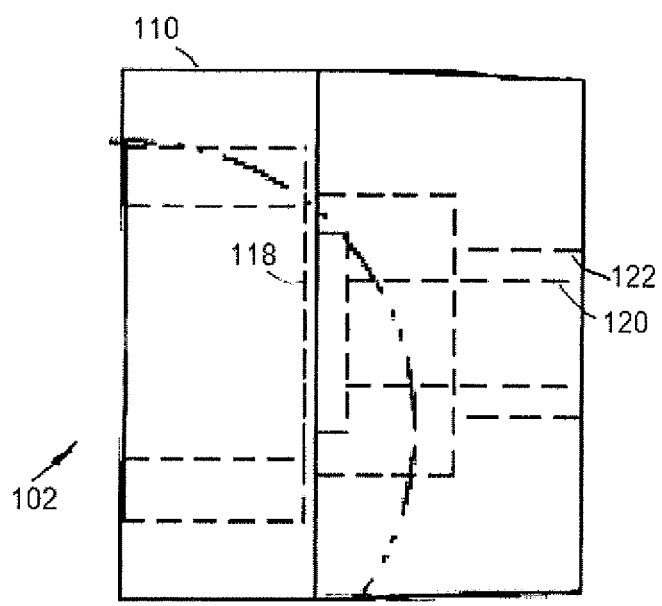
FIG. 5 is a first end view taken generally from the left-hand side thereof.
Figure 6:
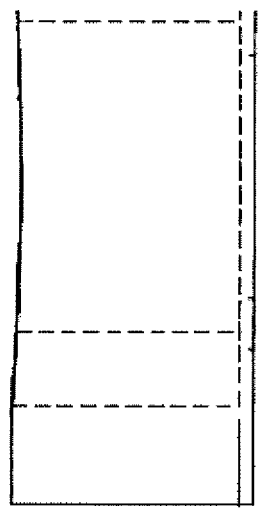
FIG. 6 is a second end view taken generally from the right-hand side thereof.
Figure 7:
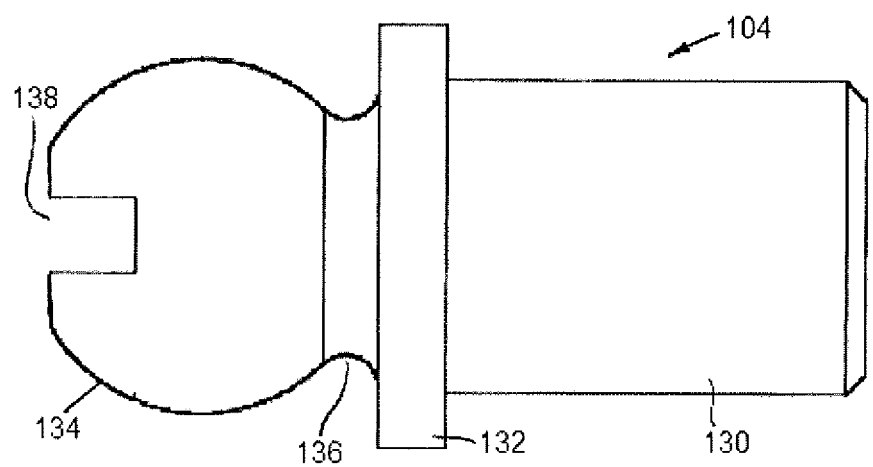
FIG. 7 is an elevational view of a retainer member that is dimensioned for receipt in one of the openings of the first receiver/jacket of FIG. 1.
Figure 8:
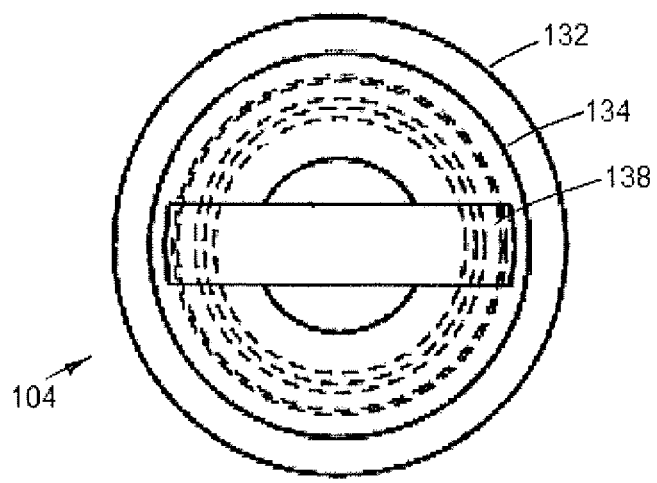
FIG. 8 is a top view of the retainer member of FIG. 7.
Figure 9:
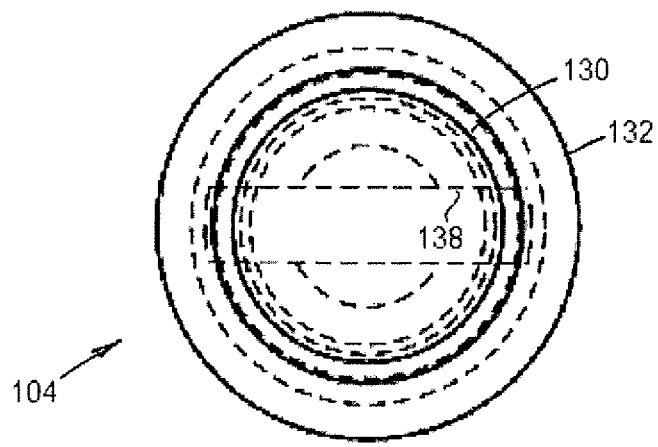
FIG. 9 is a bottom view thereof.
Figure 10:
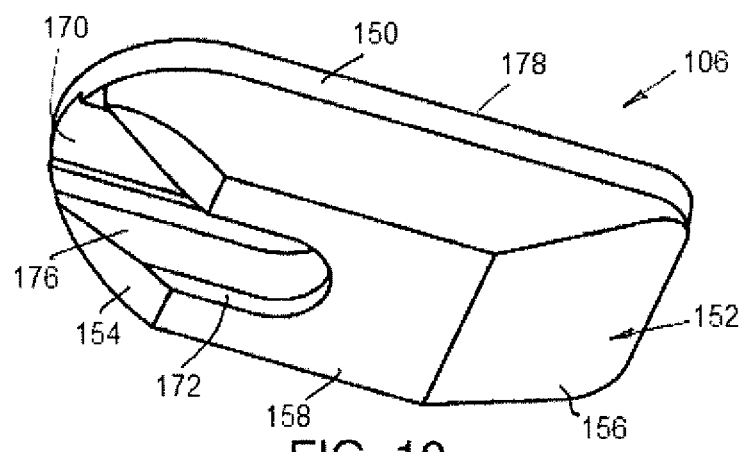
FIG. 10 is a perspective view of a first embodiment of a plug member for receipt in the receiver/jacket of FIG. 1 and retained by the retainer member of FIG. 7.
Figure 11:
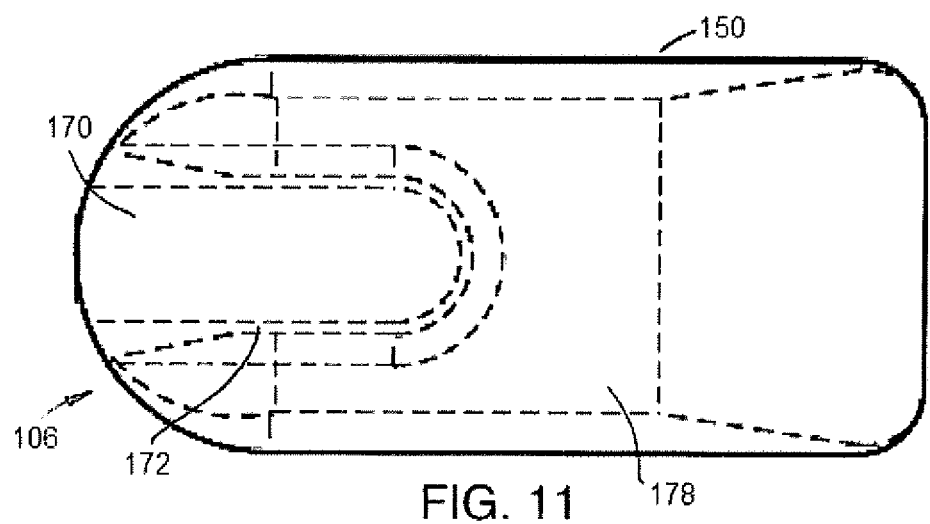
FIG. 11 is a top plan view of the plug member of FIG. 10.
Figure 12:
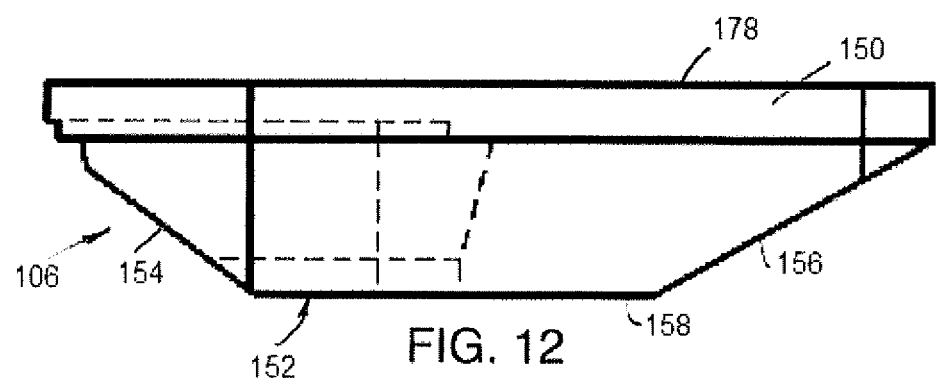
FIG. 12 is a front view thereof.

Turning initially to FIGS. 1-15, there is shown a first embodiment of a plug assembly 100 that includes a receiver/jacket 102 (FIGS. 1-6), a retainer member 104 (FIGS. 7-9), and a first plug member 106 (FIGS. 10-15). The receiver/jacket 102 of the plug assembly 100 is dimensioned for receipt in an associated recess of a mold such as a tire mold (not shown). The receiver/jacket 102 has a defined perimeter shape dimensioned for receipt in the associated similarly shaped recess of the tire mold. Specifically, in this embodiment, the receiver/jacket 102 as an outer, generally oval-shaped perimeter wall 110, a base wall 112, a wall/surface 114, and a recess or cavity 116 defined by the wall 114 and a first surface 118. The wall 114 has an irregular perimeter shape. Particularly the wall forms a generally D-shaped cavity 116 for reasons which will be described in greater detail below. Extending through the base wall 112 are first and second openings 120, 122. The first opening 120 is dimensioned to receive a fastener 124 (FIG. 3) that receives a shank 124a of the fastener therethrough and a head portion 124a that will not extend through the opening and thereby the fastener secures the receiver/jacket 102 to the tire mold. The second opening 122 also extends from the first surface 118 and through the base wall 112.

The second opening 122 is dimensioned to receive the retainer 104 (FIGS. 7-9), and particularly a stem 130 of the retainer. Shoulder 132 of the retainer 104 is dimensioned so that the shoulder cannot pass through the second opening 122. Further, the retainer 104 includes an enlarged head 134 that preferably has a generally spherical or ball shape that interconnects with the shoulder 132 via reduced dimension neck 136. A portion of the stem 130 is externally threaded so that a tool slot 138 in the head 134 can receive a tool (such as a flat blade of a conventional screwdriver—not shown) to advance the stem into threaded engagement with the second opening 122.

Figure 13:
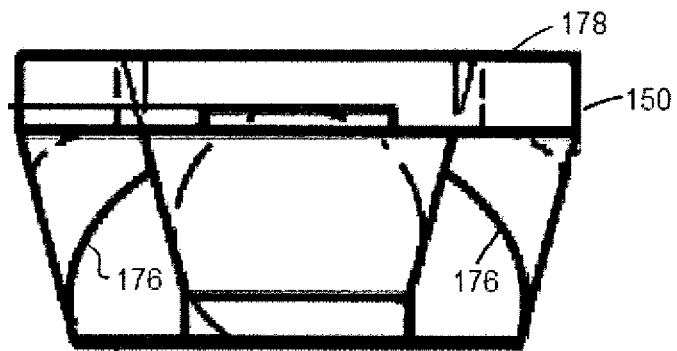
FIG. 13 is an end view taken from the left-hand side thereof.
Figure 14:
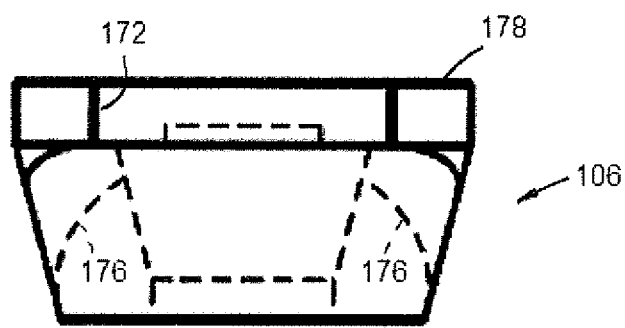
FIG. 14 is an end view taken from the right-hand side thereof.
Figure 15:
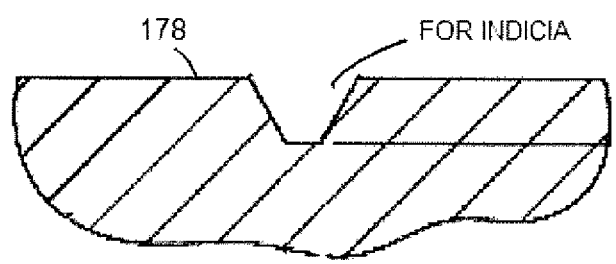
FIG. 15 is a cross-sectional view.
Figure 16:
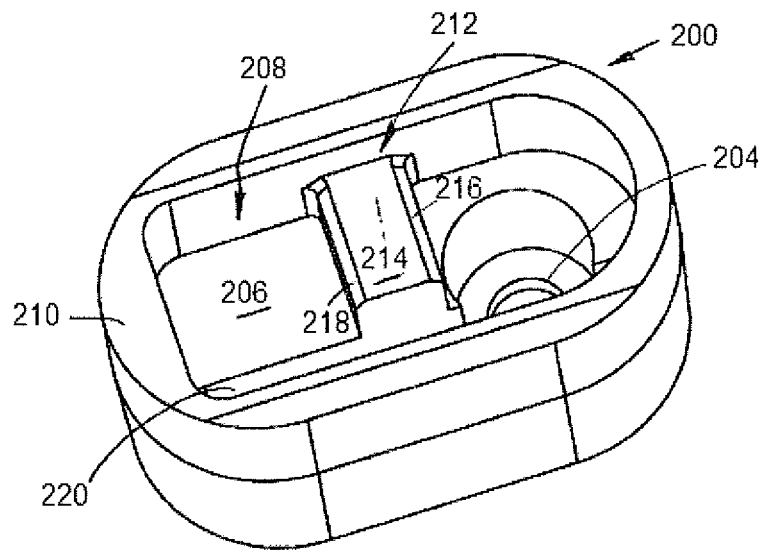
FIG. 16 is a perspective view of a second receiver/jacket of a plug arrangement/plug assembly.
Figure 17:
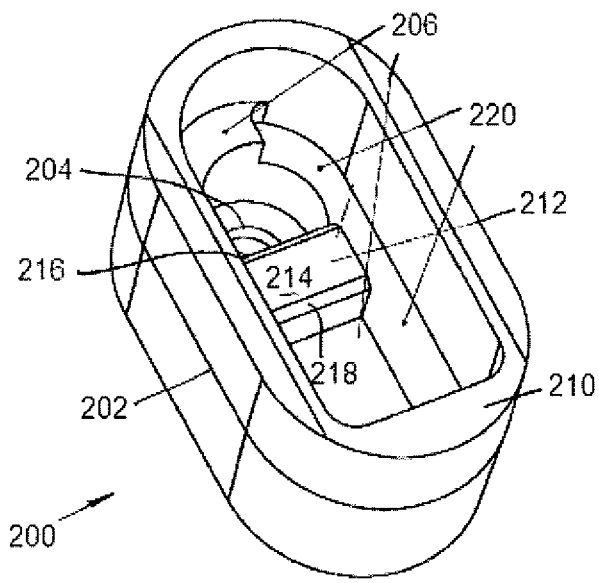
FIG. 17 is another perspective view of the second receiver/jacket of FIG. 16.
Figure 18:
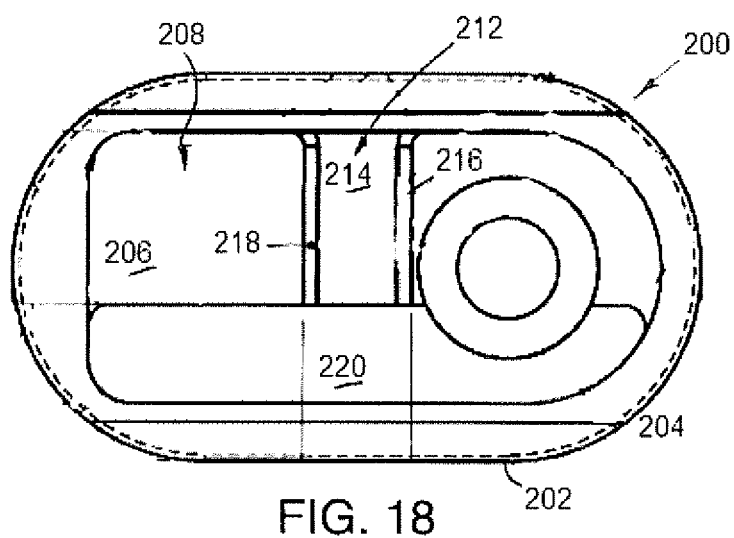
FIG. 18 is a top plan view of the receiver/jacket of FIGS. 16-17.
Figure 19:
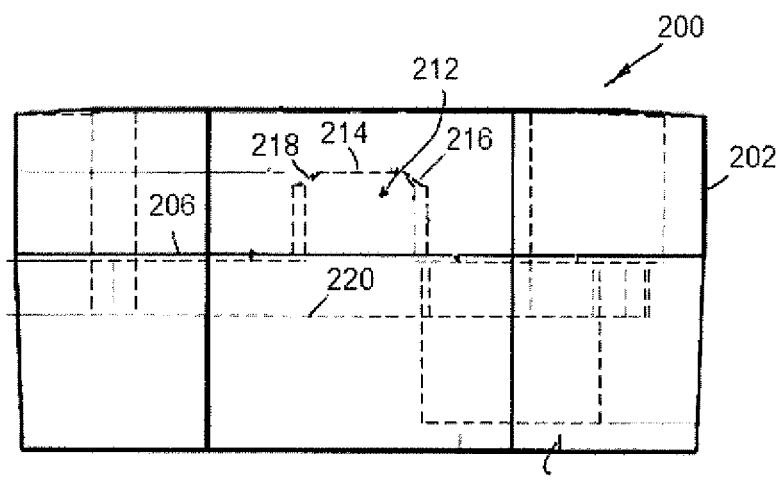
FIG. 19 is a front elevational view thereof.
Figure 20:
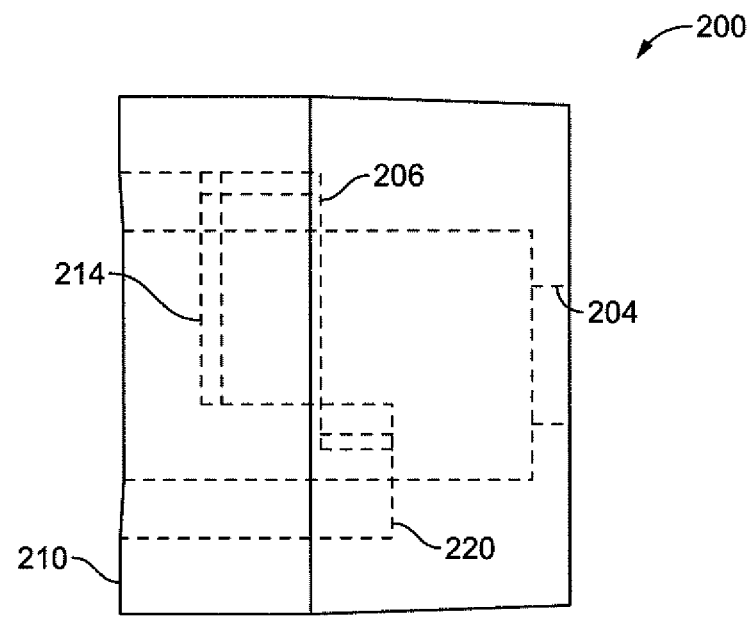
FIG. 20 is a first end view taken generally from the right-hand side thereof.
Figure 21:
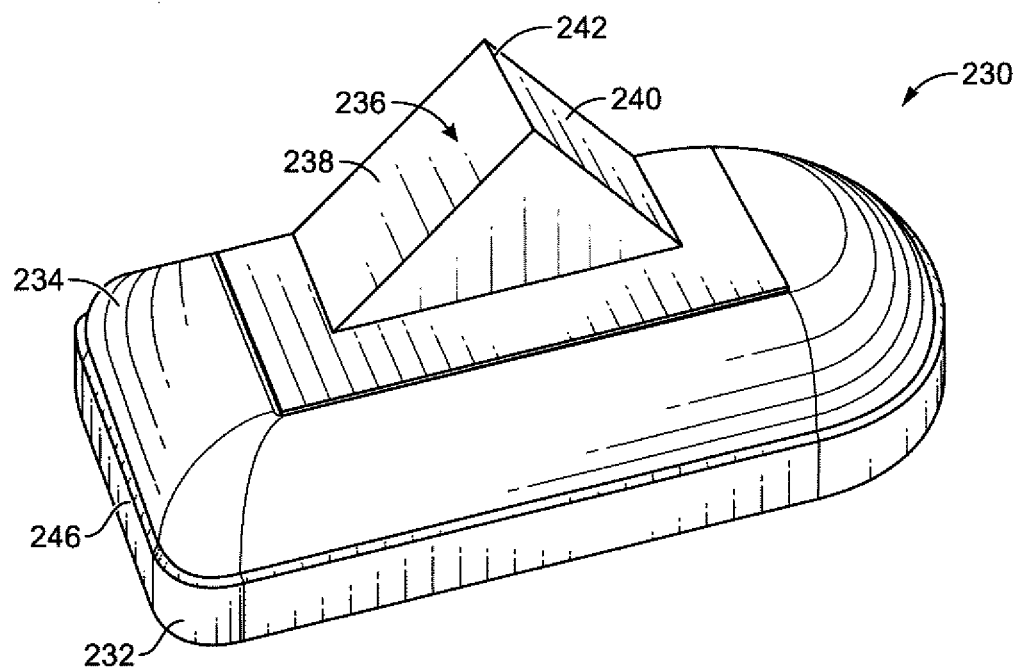
FIG. 21 is a perspective view of a second embodiment of a plug member for receipt in the receiver/jacket of FIGS. 16-20 and retained by a friction fit therein.

FIGS. 10-15 illustrate the removable, first plug 106 in greater detail. The first plug 106 has a generally D-shaped outer perimeter 150 that is dimensioned for a removable, press or friction fit in the cavity 116 of the receiver/jacket 102. A first or rear face 152 includes first and second angled surfaces 154, 156 extending inwardly from respective first and second ends of the plug 106. Each of the angled surfaces 154, 156 merge into planar surface 158 that is generally centrally located on the rear face 152 of the plug 106. The plug 106 further includes a recess 170 that extends inwardly from the perimeter 150 of the plug, and the recess is dimensioned to receive the enlarged spherical head 134 of the retainer 104 therein. During installation and removal, the angled surface 154 is oriented generally parallel to surface 118 that forms the cavity in the receiver/jacket 102, and the recess 170 receives the spherical head 134 and reduced dimension neck 136 of the retainer 104 is dimensioned for sliding receipt beneath a U-shaped undercut edge 172 that partially forms the recess. As a result, the curved, first end of the plug is advanced into the cavity of the receiver/jacket 102, and the undercut edge 172 is slidably received over the neck 136 and the enlarged spherical head 134 prevents inadvertent removal of the plug outwardly from the receiver/jacket cavity in a direction perpendicular to surface 118 thereof, i.e., in a direction parallel to the axis of the retainer stem 130. In addition, the contour of the recess 170 includes partial spheroidal portions 174 that conform to the outer surface of the enlarged spherical head 134 of the retainer 104 (FIGS. 13-14). Once the plug 106 is fully inserted in the cavity 116 of the receiver/jacket 102, the plug has been tilted so that planar surface 158 of the plug is disposed in planar, mating contact with the surface 118 of the receiver/jacket. Thus, the curved end of the plug 106 mates with the curved end of the recess 116 in the receiver/jacket 102 (that is, the plug can only be inserted into the jacket recess in one direction whereby the curved ends are aligned). Once the plug is mounted in the cavity 116 of the receiver/jacket 102, an outer, second face 178 of the plug 106 is flush with the mold surface. Any desired indicia, e.g., date information such as numerical representations of the day/month/year can be provided (e.g., engraved) on the second face 178 of the plug 106 so that the desired information is formed in the surface of the molded product (e.g. tire). Since the mold will be used for an extended period of time, it is then necessary to periodically remove the plug 106 so that the information provided by the indicia and molded into the product is kept up-to-date. By way of example, the first plug 106 may be removed weekly and a new first plug with up-to-date indicia installed before the production run of a particular week.

FIGS. 16-20 show a second receiver/jacket 200 that is provided for use in connection with the mold (not shown). The second receiver/jacket 200 has an external perimeter 202 that mates with a suitably shaped recess (not shown) in the mold (not shown). The second receiver/jacket 200 is secured in the mold recess via a fastener (e.g., a fastener such as a threaded cap screw) configured for receipt through opening 204 in a recessed surface 206 that forms, at least in part, the lower boundary of a cavity 208 that is generally D-shaped and receives a correspondingly D-shaped second plug (to be described further below). Extending upwardly from the recess surface 206 toward outer face 210 is a support member 212. The support member 212 is generally centrally located along one side of the cavity 208 and generally bisects the cavity in a longitudinal direction. The support member 212 includes an upper, planar surface 214 that includes chamfered edges 216, 218 on opposite ends thereof. Additionally, a channel 220 extends along the opposite side of the cavity 208 and is recessed further than surface 206.

Figure 22:
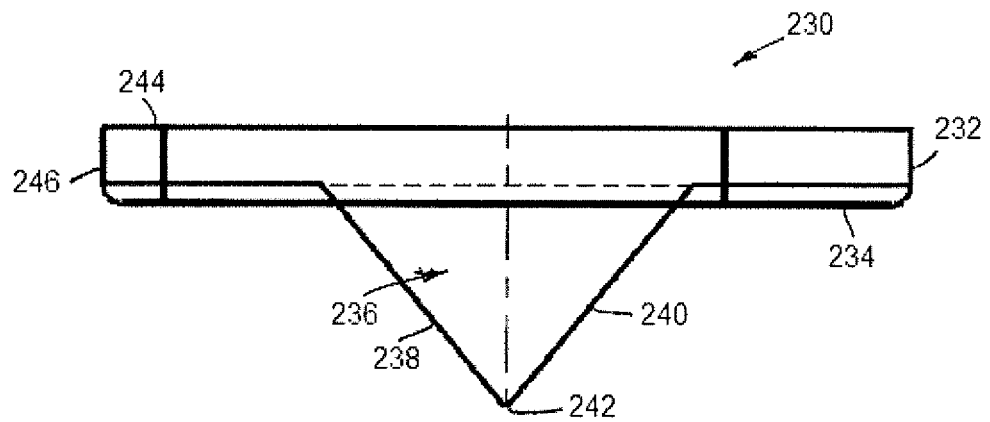
FIG. 22 is a front view of the second plug member of FIG. 21.
Figure 23:
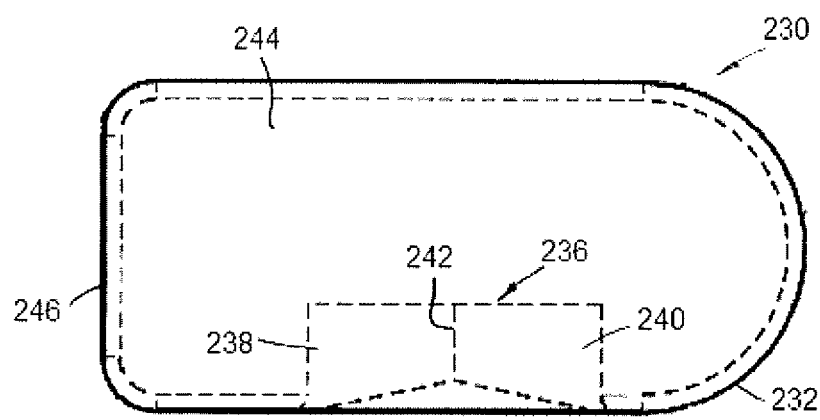
FIG. 23 is a top plan view thereof.
Figure 24:
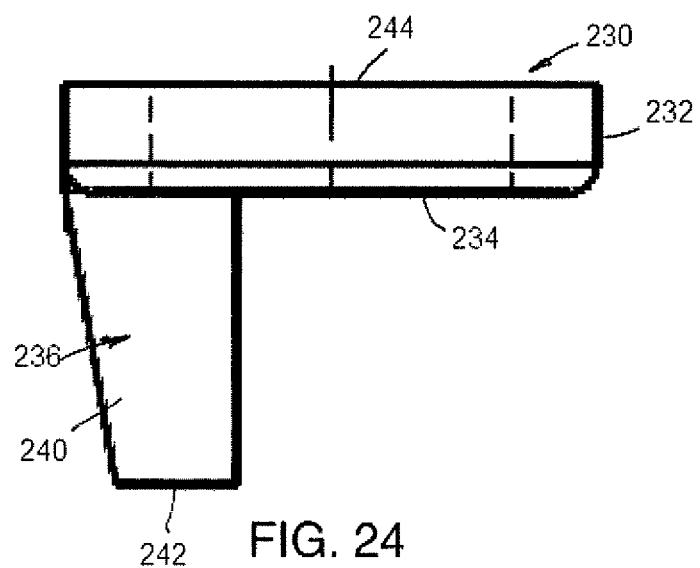
FIG. 24 is an end view taken generally from the right-hand side of FIG. 23.

A second plug 230 (FIGS. 21-24) has an external perimeter 232 that is generally D-shaped for mating receipt in the cavity 208 of the second receiver/jacket 200. The second plug 230 includes a lower, first face 234 that is intended to face into the cavity of the second receiver/jacket 200. A protrusion 236 extends outwardly from the face 234 and is dimensioned for receipt in the channel 220. Particularly, the protrusion 236 has a generally triangular-shaped contour defined by angled faces 238, 240 and a vertex 242 defined by the intersection of these angled faces (FIG. 22). The vertex 242 in combination with the chamfered edges 216, 218 of the support member 212 allow for a selective pivoting or rocking of the second plug 230 when a downward force is applied to an upper, second face 244 of the second plug. The protrusion also angles inwardly from a perimeter edge 202 of the second plug 230 as particularly illustrated in FIG. 24, again to facilitate insertion and removal of the second plug from the associated receiver 200.

More specifically, the D-shaped perimeter 232 of the second plug 230 only permits a singular orientation of the second plug into the D-shaped cavity 208 second receiver/jacket 200. In addition, the protrusion 236 is aligned over the channel 220 in this orientation and the face 234 of the second plug abuts against surface 214 of the support member 212. Dimensioning of the outer perimeter 232 of the second plug 230 in the cavity 208 provides a tight friction fit that retains the second plug in place. Once the second plug 230 is inserted in the second receiver/jacket 200, pressing downwardly on the second face 244 in the region of the second face located between the vertex 242 and the straight line perimeter portion 246 (FIG. 23) pivots the second plug whereby the second face 244 of the second plug (specifically the opposite side or arc side of the plug) is tilted upwardly from the mold surface and can be manually removed.

It will also be appreciated that the second face 244 of the second plug may also be provided with indicia thereon (in reverse) that will provide additional, required information on the molded product (e.g. tire). For example, this additional information may relate to identifying information of the particular mold whereby the manufacturer can determine the particular mold in which a specific tire was vulcanized.

Figure 25:
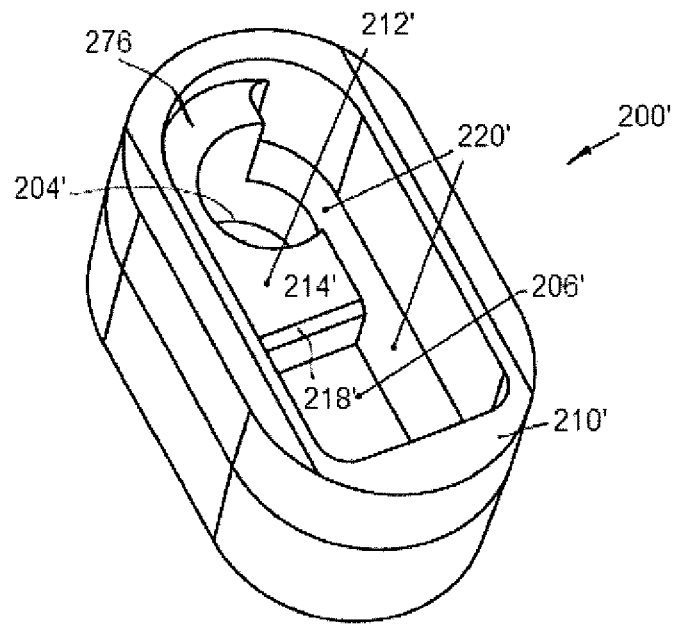
FIGS. 25 and 26 are perspective views illustrating an alternative embodiment of the second receiver/jacket.
Figure 26:
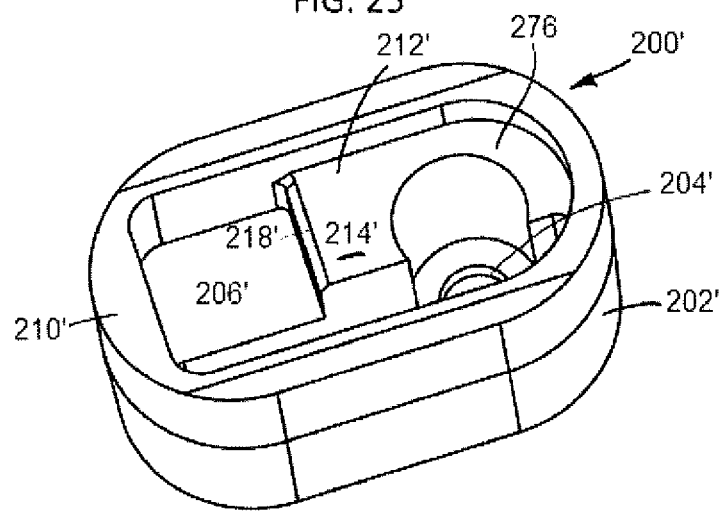
Figure 27:
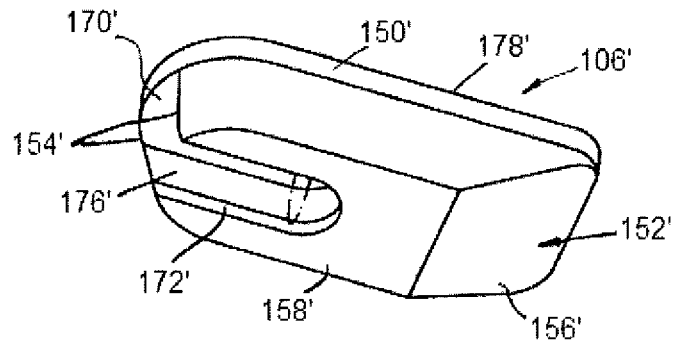
FIGS. 27-31 are views of an alternative plug.
Figure 28:
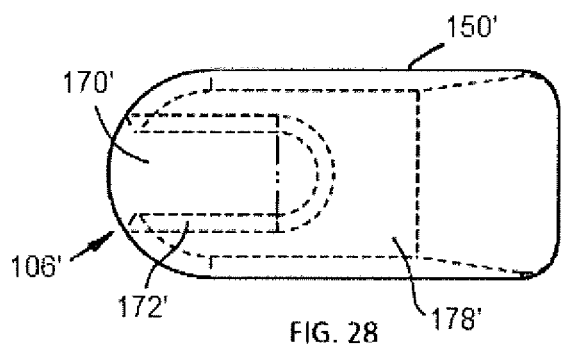
Figures 29, 30, 31:
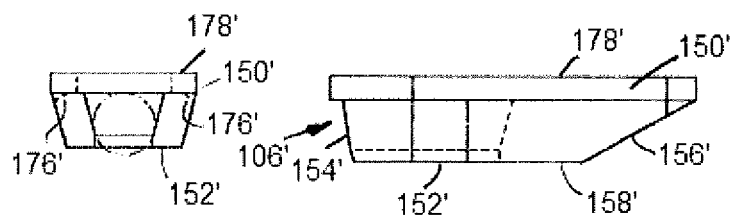

FIGS. 25-26 show a revised second receiver or jacket 200'. To facilitate a review and understanding thereof, like reference numerals with a primed suffix (') will be used to refer to like components (e.g., second receiver 200' in FIGS. 25-26 correlate to the description of the first embodiment of the second receiver/jacket 200 set forth in connection with FIGS. 16-20) and the previous description applies to the second embodiment of FIGS. 25-26 unless specifically noted otherwise. New reference numerals will be used to identify new components/features. The primary change is associated with the support member 214' and the elevation of a portion 276 of the recess surface 206'. By raising the recess surface portion 276, the second plug will not be permitted to tilt or pivot on the support member 214' in a direction toward the opening 204'. Specifically, the second plug will tip out in only one direction, i.e., along the chamfer 218' (since chamfer 216 of FIGS. 16-20 has been eliminated by raising the height of portion 276 of the recess surface 206'). In substantially all other respects, the second embodiment of the second receiver 200' is the same.

A second embodiment of an alternative plug is shown in FIGS. 27-31 and is substantially similar to the first embodiment of the plug, and particularly similar to FIGS. 10-15. For ease of description, understanding, and brevity, like reference numerals are used to describe like components or portions component with a primed (') suffix. The removable plug 106' has a generally D-shaped outer perimeter 150' that is likewise dimensioned for a removable, press or friction fit in the cavity 116 of the receiver/jacket 102. A primary difference is the modification or elimination of angled surface 154 as used in the embodiment of FIGS. 10-15. Instead, the surface 154' extends generally perpendicular (i.e., is not as acutely angled) from planar surface 158'. Surface 156' is still angled in the same manner as the earlier embodiment, and extends inwardly from its associated end of the plug 106'. Planar surface 158' is generally centrally located on the rear face 152' of the plug 106'. The plug 106' further includes a recess 170' that extends inwardly from the perimeter 150 of the plug, and the recess is dimensioned to receive the enlarged spherical head 134 of the retainer 104 therein. In substantially all other respects, the alternative plug 106' of FIGS. 27-31 is structurally and functionally similar to that shown and described in connection with FIGS. 10-14.

Figure 32:
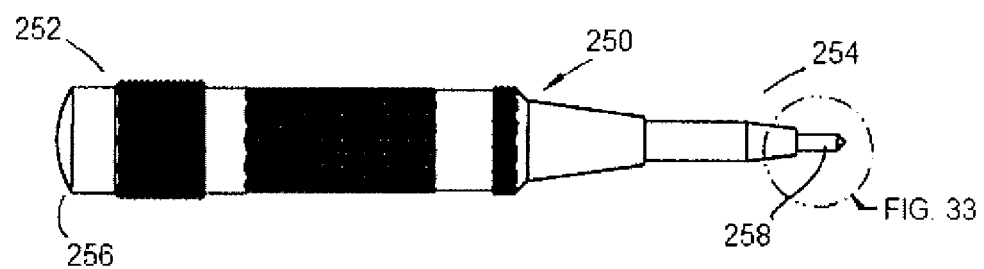
FIGS. 32 and 33 show a preferred tool used for installation and removal of the plugs.
Figure 33:
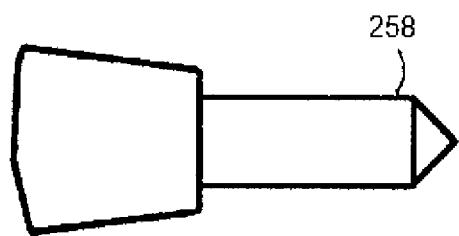

Heretofore, it was common to use a hammer and punch to remove plugs from the mold. As will be appreciated, this could result in potential damage to the surface of the mold. To further limit potential damage, the above-described first and second plugs may be removed with a tip out plug tool 250 shown in FIGS. 32 and 33. The tip out plug tool 250 includes a first end 252 and a distal second end 254. The first end 252 includes a bulbous member 256 that is adapted to facilitate gripping of the tool 250 by a user while controlling the distal second end 254 of the tool. The bulbous member 256 may also be advantageously employed as a mallet for providing a striking force to another object. Preferably, the bulbous number 256 is formed from a thermoplastic such as polyoxymethylene (POM) more commonly referred to as acetyl, polyacetyl, or polyformaldehyde to prevent damage to the mold if the bulbous member is used as a mallet. The distal second end 254 of the tool 250 preferably includes a biased or spring-loaded center punch. The spring-loaded center punch includes an end tip 258 formed from the POM described above or another similar material that minimizes scratching and/or damage to the mold, such as brass for example. The pointed tip 258 is preferably located on a striking surface of the center punch and at the very end where the tip is adapted to engage the upper surface of the first plug or the second plug and thereby minimize any slipping of the end tip relative to the first or second plug when employing the tool to remove one of the plugs from their respective receiver/jacket.

It will be appreciated that the first and second plug assemblies described above and their associated jacket/receivers are designed to make installation and removal of the plugs easier and faster. Current style plugs are removed with a hammer and punch which can lead to damaging the sidewall of the tire mold, for example. The first and second plugs described above are designed to be installed and removed without a hammer and punch thus substantially reducing the potential for damaging the sidewall of the tire mold. The first and second plugs are also designed to prevent the plug from being installed improperly in the tire mold. More specifically, the first plug assembly includes the receiver/jacket with a corresponding D-shaped cavity to receive the D-shaped first plug. The first receiver/jacket includes a first opening and an adjacent second opening formed therethrough in a bottom surface. The first opening receives a fastener to attach the receiver/jacket to a tire mold. The second opening is adapted to receive and secure a retaining member within the cavity of the first receiver/jacket. A taper is preferably formed on an opposite end of the lower surface of the first plug to facilitate removal of the first plug from the first receiver/jacket.

The second plug assembly includes a second receiver/jacket also having a D-shaped opening to receive the correspondingly shaped D-shaped second plug. The second receiver/jacket and the second plug are designed to provide a friction fit to facilitate retention of the second plug within the cavity of the second receiver/jacket. The second receiver/jacket includes an opening formed therethrough in a bottom surface that is adapted to receive a fastener for attaching the second receiver/jacket to a tire mold. A channel is formed in a bottom surface of the cavity to limit the orientation of the receiver and plug relative to one another to a single orientation and thereby minimize a likelihood of improperly inserting the second plug in an undesired orientation relative to the second receiver/jacket. The support member is formed in the surface of the receiver/jacket. The support member is located within the cavity and provides a fulcrum point for tipping the triangular-shaped plug portion relative to the receiver/jacket to facilitate removal of the plug from the receiver/jacket. The second plug includes an upper surface for engraving desired indicia thereon. Adjacent one edge of the lower face of the second plug is a triangular-shaped protrusion. The triangular-shaped protrusion is received in the channel formed in the cavity of the receiver/jacket.

Each of the first and second plugs minimize the potential that one of the plugs and receivers/jackets will be improperly inserted into its desired location of the tire mold. This assures that the date code plug will be inserted into the proper location in the mold while the curing press information will be likewise inserted into its proper location in the tire mold. The first and second receivers/jackets of the first and second plugs will not readily accept the other style of plug. Moreover, by providing a plug tool for installation and removal of the plugs, excessive force or hammering will be avoided.

This written description uses examples to describe the disclosure, including the best mode, and also to enable any person skilled in the art to make and use the disclosure. Other examples that occur to those skilled in the art are intended to be within the scope of the invention if they have structural elements that do not differ from the same concept, or if they include equivalent structural elements with insubstantial differences.

What is claimed is:

1. A plug assembly for a tire mold, the plug assembly comprising:
   a receiver or jacket having a first face with a cavity extending inwardly therefrom to a first surface;
   a fastener for securing the receiver to an associated tire mold;
   a securing member extending from the receiver into the cavity, the securing member including a spherical portion at a distal end of a stem that is connected to the receiver first surface; and
   a plug contoured and dimensioned for mating receipt in the receiver cavity and retained therein by engagement with the securing member.

2. The plug assembly of claim 1 wherein the first surface of the jacket/receiver includes a first opening extending therethrough dimensioned to receive the fastener.

3. The plug assembly of claim 2 wherein the plug includes a recess extending inwardly from a perimeter edge of the plug and dimensioned to receive the securing member therein.

4. The plug assembly of claim 3 wherein the securing member is secured to and extends perpendicularly outward from the first surface of the receiver, and the recess extends in a direction substantially perpendicular to the securing member.

5. The plug assembly of claim 4 further comprising an angled surface on a rear face of the plug that faces the first surface of the receiver.

6. The plug assembly of claim 5 wherein the angled surface extends inwardly from a first end of the plug, and the plug includes another angled surface extending inwardly from a second end of the plug.

7. The plug assembly of claim 1 wherein the spherical portion has a greater cross-sectional dimension than a cross-sectional dimension of the stem.

8. The plug assembly of claim 7 wherein the plug includes a recess extending inwardly from a perimeter edge of the plug and dimensioned to receive the stem therein and the spherical portion of the securing member has a greater cross-sectional dimension than undercut shoulders that define the recess and prevent inadvertent removal of the plug from the receiver.

9. The plug assembly of claim 1 wherein the plug includes first and second angled surfaces that extend inwardly from opposite, first and second ends, respectively, of the plug toward a central planar portion.

10. The plug assembly of claim 1 wherein the cavity has a D-shaped perimeter, and the plug has a similarly contoured, D-shaped perimeter.

11. A plug assembly for a tire mold, the plug assembly comprising:
    a receiver having a first surface with a cavity extending inwardly therefrom, the first surface including a slot;

a fastener for securing the receiver to an associated tire mold; and a plug contoured and dimensioned for mating receipt in the receiver cavity, the plug including a protrusion extending from a first surface thereof and dimensioned for receipt in the receiver slot.

12. The plug assembly of claim 11 further comprising a wall extending above the first surface of the receiver adjacent the slot serving as a fulcrum point for tipping the plug relative to the receiver when received therein.

13. The plug assembly of claim 12 wherein the wall extends perpendicular to the slot.

14. The plug assembly of claim 11 wherein the protrusion has a triangular shape.

15. The plug assembly of claim 11 wherein an outer perimeter of the plug and an inner perimeter of the cavity are dimensioned for a friction fit that retains the plug in the receiver.

16. The plug assembly of claim 11 wherein the slot is formed along an edge of the receiver, and the protrusion is formed along an edge of the plug whereby the plug is capable of receipt in the receiver in only a single orientation when the protrusion faces the receiver first surface.

17. The plug assembly of claim 11 wherein the cavity has a D-shaped perimeter, and the plug has a similarly contoured, D-shaped perimeter.

18. A combination of plug assemblies for a tire mold, the combination comprising:

a first receiver having a first face with a cavity extending inwardly therefrom to a cavity first surface;

a first fastener for securing the first receiver to an associated tire mold;

a first securing member extending from the receiver into the cavity;

a first plug contoured and dimensioned for mating receipt in the first receiver cavity and retained therein by engagement with the first securing member;

a second receiver having a first surface with a cavity extending inwardly therefrom, the first surface including a slot;

a second fastener for securing the second receiver to the associated tire mold; and a second plug contoured and dimensioned for mating receipt in the second receiver cavity, the second plug including a protrusion extending from a first surface thereof and dimensioned for receipt in the second receiver slot.

19. The combination of claim 18 wherein at least one of the first plug and the first receiver has a conformation that precludes mating engagement with the second receiver and the second plug, respectively.

20. The combination of claim 18 further comprising a plug removal tool having an enlarged, first end to facilitate gripping by an associated user, and a second end that includes a pointed tip for engaging the plug mounted to the associated tire mold.

21. The combination of claim 20 wherein the pointed tip is urged outwardly from the tool by a biasing member.

22. The combination of claim 21 further comprising a polymer material surrounding the pointed tip that minimizes potential damage to the associated tire mold.

* * * * *